United States Patent
Peng

(10) Patent No.: US 9,639,113 B2
(45) Date of Patent: May 2, 2017

(54) DISPLAY METHOD AND ELECTRONIC DEVICE

(71) Applicant: LENOVO (BEIJING) LIMITED, Beijing (CN)

(72) Inventor: Gang Peng, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 1 day.

(21) Appl. No.: 14/227,873

(22) Filed: Mar. 27, 2014

(65) Prior Publication Data

US 2015/0042633 A1 Feb. 12, 2015

(30) Foreign Application Priority Data

Aug. 9, 2013 (CN) .......................... 2013 1 0347004

(51) Int. Cl.
*G06F 3/14* (2006.01)
*G06F 1/00* (2006.01)

(52) U.S. Cl.
CPC .............. *G06F 1/00* (2013.01); *G06F 3/1423* (2013.01); *G06F 3/1446* (2013.01); *G06F 3/1454* (2013.01); *G09G 2330/021* (2013.01); *G09G 2354/00* (2013.01); *G09G 2356/00* (2013.01)

(58) Field of Classification Search
None
See application file for complete search history.

(56) References Cited

U.S. PATENT DOCUMENTS

| | | | |
|---|---|---|---|
| 2011/0197147 A1* | 8/2011 | Fai | G06F 1/1639 715/753 |
| 2011/0239114 A1* | 9/2011 | Falkenburg et al. | 715/702 |
| 2012/0030632 A1* | 2/2012 | McRae et al. | 715/863 |
| 2012/0032979 A1* | 2/2012 | Blow | G06F 1/1626 345/647 |
| 2013/0141331 A1* | 6/2013 | Shiu et al. | 345/158 |
| 2014/0229858 A1* | 8/2014 | Bleker et al. | 715/753 |
| 2014/0359477 A1* | 12/2014 | Chen | 715/748 |

FOREIGN PATENT DOCUMENTS

| CN | 101551837 A | 10/2009 |
|---|---|---|
| CN | 103197906 A | 7/2013 |

* cited by examiner

*Primary Examiner* — Larry Sternbane
*Assistant Examiner* — Christopher Kohlman
(74) *Attorney, Agent, or Firm* — Kinney & Lange, P.A.

(57) ABSTRACT

The present invention relates to communication technology and provides a display method and an electronic device capable of solving the problem associated with limited operation space due to a small screen of an electronic device. In particular, the method comprises: detecting a trigger event when the first display unit displays a first content and the second display unit is in a first power consumption state; determining whether the trigger event satisfies a predetermined condition to obtain a determination result; generating a switching instruction when the determination result indicates that the trigger event satisfies the predetermined condition; and switching the second display unit from the first power consumption state to a second power consumption state and displaying the first content on the second display unit in response to the switching instruction. The first power consumption state has a lower power consumption than the second power consumption state. The present invention can be applied in a display of an electronic device.

17 Claims, 3 Drawing Sheets

# DISPLAY METHOD AND ELECTRONIC DEVICE

TECHNICAL FIELD

The present invention relates to communication technology, and more particularly, to a display method and an electronic device.

BACKGROUND

Currently the boundary between Pads and notebook computers is becoming more and more blurred. For example, some Pads are provided with attachable keyboards. There have been several such Pads available in the market. However, a Pad typically has a screen of about 10 inches due to its transportability. When such pad is connected with a keyboard, its screen is smaller than a screen of an ordinary notebook computer, resulting in a limited operation space.

SUMMARY

It is an object of the present invention to provide a display method and an electronic device, capable of enlarging a content display area on a display unit.

In order to achieve the above object, the embodiments of the present invention provide the following solutions.

In a first aspect, a display method is provided. The display method is applied in an electronic device comprising or being connected with a first display unit and further comprising or being connected with a second display unit. The method comprises: detecting a trigger event when the first display unit displays a first content and the second display unit is in a first power consumption state; determining whether the trigger event satisfies a predetermined condition to obtain a determination result; generating a switching instruction when the determination result indicates that the trigger event satisfies the predetermined condition; and switching the second display unit from the first power consumption state to a second power consumption state and displaying the first content on the second display unit in response to the switching instruction. The first power consumption state has a lower power consumption than the second power consumption state.

In a second aspect, an electronic device is provided. The electronic device comprises or is connected with a first display unit and further comprises or is connected with a second display unit. The electronic device further comprises: a detection unit configured to detect a trigger event when the first display unit displays a first content and the second display unit is in a first power consumption state; a determination unit configured to determine whether the trigger event satisfies a predetermined condition to obtain a determination result; a generation unit configured to generate a switching instruction when the determination result indicates that the trigger event satisfies the predetermined condition; and a first switching unit configured to switch the second display unit from the first power consumption state to a second power consumption state and display the first content on the second display unit in response to the switching instruction. The first power consumption state has a lower power consumption than the second power consumption state.

With the display method and electronic device according to the embodiments of the present invention, the electronic device can switch the second display unit from the first power consumption state to the second power consumption state in response to the switching instruction and display the first content on the second display unit. That is, the electronic device can display the first content displayed on the first display unit on the second display unit in response to the switching instruction. In this way, the first content can be displayed on both the first and second display units. Compared with the conventional scheme where the first content is displayed only on the first display unit, thereby enlarging the content display area on the display unit.

BRIEF DESCRIPTION OF THE DRAWINGS

For clear illustration of the solutions according to the embodiments of the present invention, the figures used for describing the embodiments will be briefly introduced in the following. Obviously, the figures described below are only some of the embodiments of the present invention. Starting from these figures, those skilled in the art can obtain other figures without applying any inventive skills.

DETAILED DESCRIPTION OF THE EMBODIMENTS

In the following, the solutions according to the embodiments of the present invention will be described clearly and fully with reference to the figures. Obviously, the embodiments described below are only some, rather than all, of the embodiments. Starting from the embodiments of the present invention, those skilled in the art can obtain other embodiments with applying any inventive skills. All these embodiments are to be encompassed by the scope of the present invention.

According to an embodiment, a display method is provided. The method can be applied in an electronic device. The electronic device includes or is connected with a first display unit and further includes or is connected with a second display unit.

Figure 1:
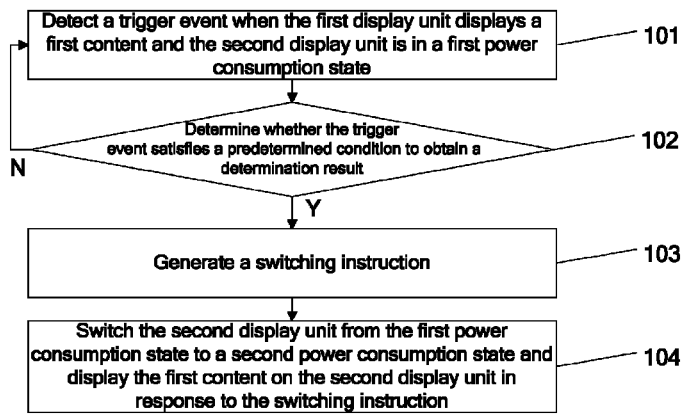
FIG. 1 is a flowchart illustrating a display method according to an embodiment.

As shown in FIG. 1, the display method according to this embodiment includes the following steps.

At step 101, a trigger event is detected when the first display unit displays a first content and the second display unit is in a first power consumption state.

The position of the first content can be changed when the display area of the first display unit cannot meet an actual requirement, when the first display unit is not suitable for display the content, or when a user instructs to change the display position. For example, the first content can be displayed on the second display unit.

A display instruction for instructing to display the first content on the second display unit needs to be obtained before the first content can be displayed on the second display unit.

At step 102, it is determined whether the trigger event satisfies a predetermined condition to obtain a determination result. When the predetermined condition is satisfied, the method proceeds with step 103; otherwise the method proceeds with step 101.

At step 103, a switching instruction is generated.

As an implementation of this embodiment, the electronic device may determine the second display unit for displaying the first content based on the trigger event. Then, based on the trigger event and the determined second display unit, the electronic device can generate the switching instruction for instructing the electronic device to adjust the power consumption state of the second display unit and to display the first content on the second display unit.

At step 104, the second display unit is switched from the first power consumption state to a second power consumption state and the first content is displayed on the second display unit in response to the switching instruction. The first power consumption state has a lower power consumption than the second power consumption state.

With the above solution, the electronic device can switch the second display unit from the first power consumption state to the second power consumption state in response to the switching instruction and display the first content on the second display unit. That is, the electronic device can display the first content displayed on the first display unit on the second display unit in response to the switching instruction. In this way, the first content can be displayed on both the first and second display units. Compared with the conventional scheme where the first content is displayed only on the first display unit, thereby enlarging the content display area on the display unit.

Figure 2:
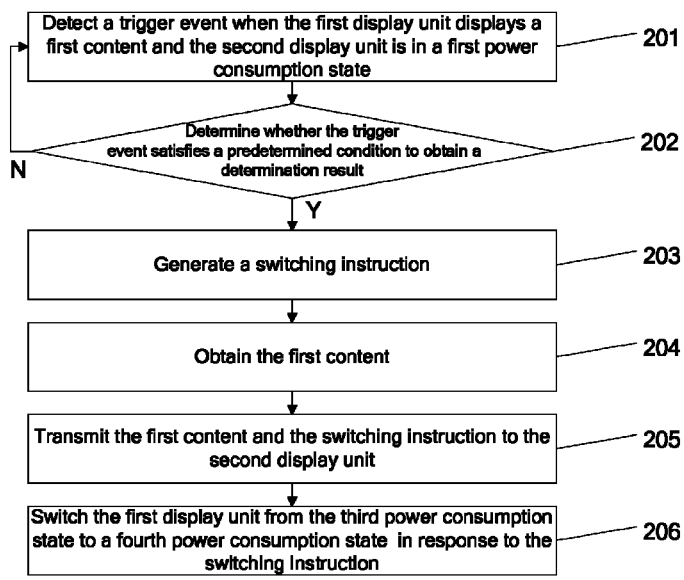
FIG. 2 is a flowchart illustrating another display method according to an embodiment.

According to an embodiment, another display method is provided. This method is an extension of the method shown in FIG. 1. As shown in FIG. 2, the method includes the following steps.

At step 201, a trigger event is detected when the first display unit displays a first content and the second display unit is in a first power consumption state.

As an implementation of this embodiment, the electronic device can determine to display the first content on the second display unit based on a parameter it detects. The electronic device can detect an operation using a sensor.

At step 202, it is determined whether the trigger event satisfies a predetermined condition to obtain a determination result. When the predetermined condition is satisfied, the method proceeds with step 203; otherwise the method proceeds with step 201.

At step 203, a switching instruction is generated.

Here the switching instruction can include, but not limited to, a first sub-instruction for instructing the second display unit to be switched from the first power consumption state to the second power consumption state and a second sub-instruction for instructing the second display unit to display the first content.

The first power consumption state has a lower power consumption than the second power consumption state.

Some specific examples will be given below for explaining the steps 201-203 in detail.

EXAMPLE 1

The user can control the display of the second display unit using a gesture. For example, the user may point his/her finger towards the direction where the second display unit is located to instruct the second display unit to display the first content. The electronic device can be provided with an image capture device for capturing an image containing a gesture.

In particular, the electronic device obtains an instruction image (i.e., an image containing a gesture) using the image capture device, determines whether the instruction image is a predetermined image. The predetermined condition is satisfied when the instruction image is the predetermined image. The switching instruction is generated based on the instruction image when the determination result indicates that the trigger event satisfies the predetermined condition.

As an implementation of this embodiment, the electronic device displays the first content on the first display unit. When the user wants to use the second display unit to display the first content, he/she can point his/her finger towards the direction of the second display unit. When an instruction image containing this gesture is captured by the image capture device of the electronic device, the captured instruction image can be analyzed to determine whether the gesture contained in the captured instruction image is a predetermined gesture. If so, the electronic device can determine the second display unit based on the direction the gesture in the image points to and then obtain an identifier of the second display unit. Then, the electronic device generates a switching instruction which can include the identifier of the second display unit. When there are only two display units (i.e., the first and second display units), it is not necessary that the predetermined gesture points to the direction of the second display unit. For example, the predetermined gesture can include, but not limited to, moving a hand from right to left, or vice versa.

This embodiment is not limited to any specific predetermined gesture. The predetermined gesture can be set as desired and further details thereof will be omitted here.

EXAMPLE 2

When the first display unit is obscured by some object, it may not be viewed by the user. In this case, the electronic device may instruct the second display unit for displaying. The electronic device can be provided with a distance sensor for obtaining a distance between the electronic device and a nearby object.

In particular, a distance between the first display unit and a nearby object is detected using the distance sensor. Then it is determined whether the distance is shorter than a predetermined distance. The predetermined condition is satisfied when the distance is shorter than the predetermined distance. The switching instruction is generated based on the instruction image when the determination result indicates that the trigger event satisfies the predetermined condition.

As an implementation of this embodiment, the electronic device may detect the distance between the first display unit and a nearby object using the distance sensor and determine whether the distance is shorter than a predetermined distance. The predetermined condition is satisfied when the distance is shorter than the predetermined distance. Before generating the switching instruction, the electronic device can first determine the second display unit and obtain the identifier of the second display unit. Here the second display unit can be a predetermined display unit or any display unit in a power-off or standby state. Then the switching instruction is generated based on the determined second display unit. The switching instruction may include the identifier of the second display unit.

This embodiment is not limited to any specific approach for determining the second display unit. The approach for determining the second display unit can be set as desired and further details thereof will be omitted here.

EXAMPLE 3

The electronic device can be configured to display a content corresponding to a predetermined application on the second display unit once the predetermined application is initiated.

In particular, an application corresponding to the first content is detected. It is determined whether the application is a predetermined application to obtain a determination result. The predetermined condition is satisfied when the application is the predetermined application. The switching instruction is generated based on the instruction image when the determination result indicates that the trigger event satisfies the predetermined condition.

For example, the first display unit can be a notebook computer and the second display unit can be a large-size display unit. In a classroom, the notebook computer can be used for displaying first. When a slide application is initiated for demonstrating lecture materials, the slide can be displayed directly on the second display unit so as to be viewed by students.

Further, this example may include the following scenario.

The first display unit can be a display unit of a notebook computer and is displaying a first content. When two bodies of the notebook computer are changed from an open state to a closed state, the first content can be displayed on another electronic device. Alternatively, when a display surface of a tablet computer is placed upside down on any plane, the first content can be displayed on another electronic device.

This embodiment is not limited to the above application scenarios, but can be applied in other scenarios (further details thereof will be omitted here).

At step 204, the first content is obtained.

This embodiment is not limited to any specific first content. The first content can be set as desired and further details thereof will be omitted here.

At step 205, the first content and the switching instruction are transmitted to the second display unit to enable the second display unit to display the first content in response to the first and second sub-instructions.

Further, the second display unit can receive a part of the first content and display it immediately (i.e., displaying while receiving). Alternatively, the second display unit can receive the first content completely and then display it.

Further, the operation of displaying the first content on the second display unit includes: obtain a direction corresponding to an operation performed by a user (including, but not limited to, a direction the user points his/her hand to); determining a display position of the first content based on the direction to obtain position information; and displaying the first content at a position corresponding to the position information based on the position information.

Further, the second display unit can be a display or a projector.

When the second display unit is a display, the operation of displaying the first content at a position corresponding to the position information based on the position information includes: obtaining an identifier of the display corresponding to the position information; and displaying the first content on the display based on the identifier of the display.

Alternatively, when the second display unit is a projector, the operation of displaying the first content at a position corresponding to the position information based on the position information includes: determining a projection direction of the projector based on the position information, the position information containing a direction parameter representing the projection direction of the projector; and projecting the first content to a position corresponding to the direction parameter for displaying using the projector based on the direction parameter. In addition, the electronic device can change the projection direction of the projector.

As an implementation of this embodiment, the first power consumption state can include, but not limited to, a standby state or a power-off state. If the second display unit is in the power-off state before receiving the switching instruction and the first content, the second sub-instruction may include a power-on instruction for instructing the second display unit to power on. That is, the second sub-instruction can instruct the second display unit to power on and display the first content. Alternatively, if the second display unit is in the standby state before receiving the switching instruction and the first content, the second sub-instruction may include a waking instruction for instructing the second display unit to switch to an operating state. That is, the second sub-instruction can instruct the second display unit to operate and display the first content.

At step 206, the first display unit is switched from a third power consumption state to a fourth power consumption state in response to the switching instruction.

The first display unit is in the third power consumption state before this step.

The fourth power consumption state has a lower power consumption than the third power consumption state.

Further the switching instruction can include a third sub-instruction for instructing the first display unit to be switched from the third power consumption state to the fourth power consumption state and a fourth sub-instruction for instructing the first display unit to stop displaying the first content.

As an implementation of this embodiment, when the second display unit is switched from the first power consumption state to the second power consumption state in response to the switching instruction for displaying the first content, the first display unit may stop displaying the first content or may display another content. Further, the first display unit can be switched from the third power consumption state to the fourth power consumption state.

As an implementation of this embodiment, the fourth power consumption state can include, but not limited to, the standby state or the power-off state.

It is to be noted here that, after the switching step, i.e., when the second display unit is displaying the first content, the first display unit can resume displaying the first content.

In particular, when the second display unit displays the first content, the second display unit is in the second power consumption state and the first display unit is in the fourth power consumption state, a resumption trigger event can be detected. It is determined whether the resumption trigger event satisfies a predetermined resumption condition to obtain a determination result. A resumption switching instruction is generated when the determination result indicates that the resumption trigger event satisfies the predetermined resumption condition. In response to the switching instruction, the second display unit is switched from the second power consumption state to the first power consumption state or another state having a lower power consumption than the second power consumption state and the first content is displayed on the first display unit.

This embodiment is not limited to any specific state resumption process. The state resumption process can be set as desired and further details thereof will be omitted here.

With the above solution, the electronic device can generate the switching instruction in response to detecting various trigger events. The electronic device can switch the second display unit from the first power consumption state to the second power consumption state in response to the switching instruction and display the first content on the second display unit. That is, the electronic device can display the first content displayed on the first display unit on the second display unit in response to the switching instruction. In this way, the first content can be displayed on both the first and second display units. Compared with the conventional scheme where the first content is displayed only on the first display unit, thereby enlarging the content display area on the display unit.

In the following, some device embodiments will be provided. These device embodiments correspond to the above described method embodiments, respectively.

Figure 3:
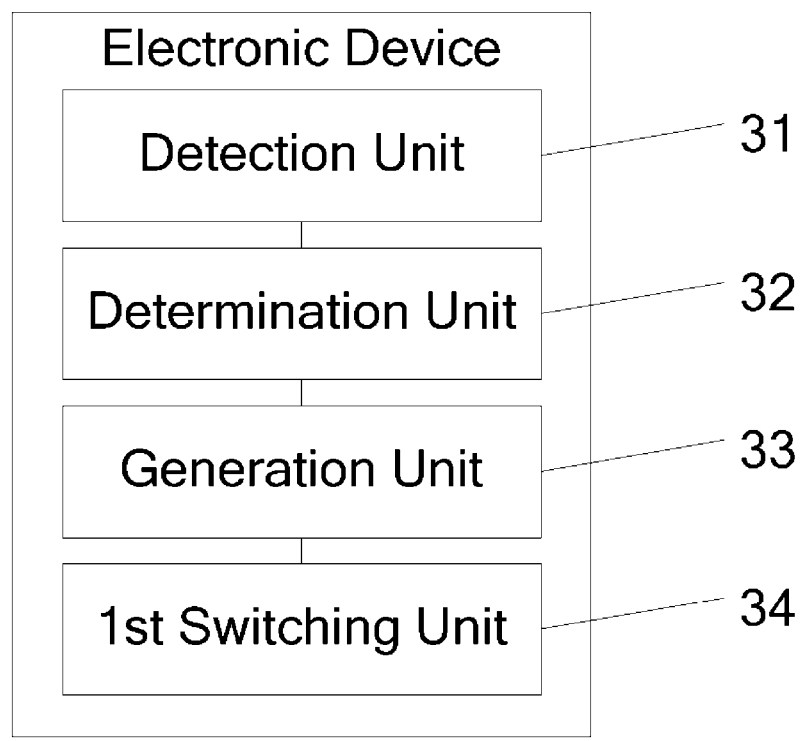
FIG. 3 is a schematic diagram showing a structure of an electronic device according to an embodiment.

According to an embodiment, an electronic device is provided. The electronic device includes or is connected with a first display unit and further includes or is connected with a second display unit. As shown in FIG. 3, the electronic device further includes:

a detection unit 31 configured to detect a trigger event when the first display unit displays a first content and the second display unit is in a first power consumption state;

a determination unit 32 configured to determine whether the trigger event satisfies a predetermined condition to obtain a determination result;

a generation unit 33 configured to generate a switching instruction when the determination result indicates that the trigger event satisfies the predetermined condition; and a first switching unit 34 configured to switch the second display unit from the first power consumption state to a second power consumption state and display the first content on the second display unit in response to the switching instruction.

The first power consumption state has a lower power consumption than the second power consumption state.

With the above solution, the electronic device can switch the second display unit from the first power consumption state to the second power consumption state in response to the switching instruction and display the first content on the second display unit. That is, the electronic device can display the first content displayed on the first display unit on the second display unit in response to the switching instruction. In this way, the first content can be displayed on both the first and second display units. Compared with the conventional scheme where the first content is displayed only on the first display unit, thereby enlarging the content display area on the display unit.

Figure 4:
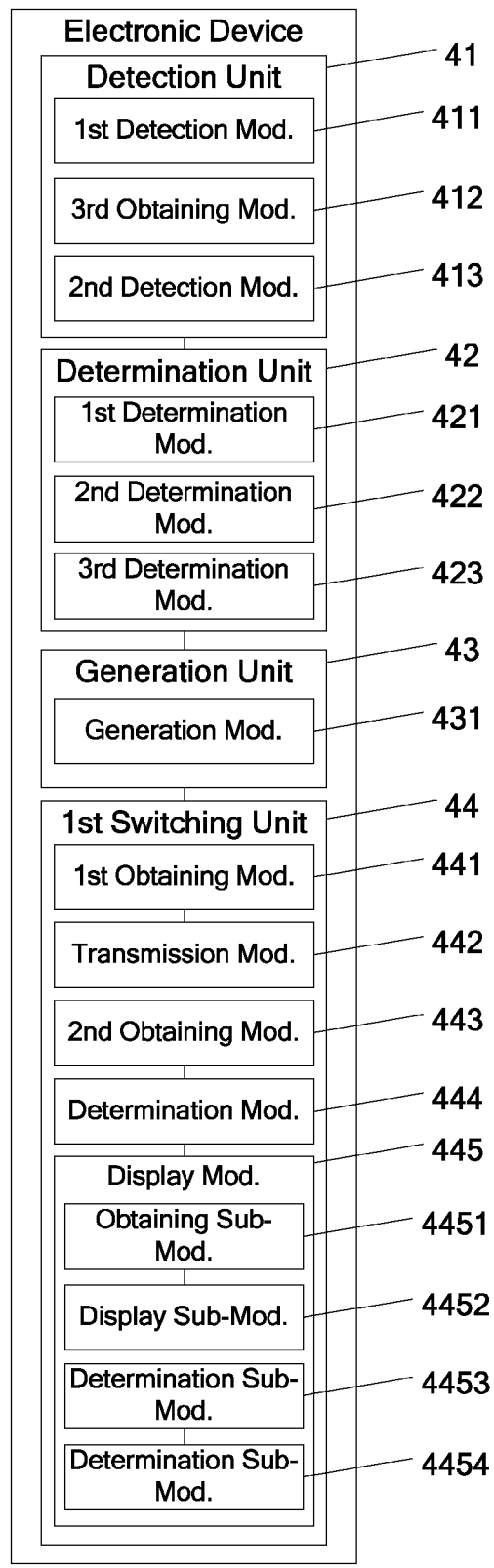
FIG. 4 is a schematic diagram showing a structure of another electronic device according to an embodiment.

According to an embodiment, another electronic device is provided. This electronic device is an extension of the electronic device shown in FIG. 3. As shown in FIG. 4, the electronic device includes or is connected with a first display unit and further includes or is connected with a second display unit. The electronic device further includes:

a detection unit 41 configured to detect a trigger event when the first display unit displays a first content and the second display unit is in a first power consumption state;

a determination unit 42 configured to determine whether the trigger event satisfies a predetermined condition to obtain a determination result;

a generation unit 43 configured to generate a switching instruction when the determination result indicates that the trigger event satisfies the predetermined condition; and a first switching unit 44 configured to switch the second display unit from the first power consumption state to a second power consumption state and display the first content on the second display unit in response to the switching instruction.

The first power consumption state has a lower power consumption than the second power consumption state.

Further, the switching instruction can include a first sub-instruction for instructing the second display unit to be switched from the first power consumption state to the second power consumption state and a second sub-instruction for instructing the second display unit to display the first content. The first switching unit 44 includes: a first obtaining module 441 configured to obtain the first content; and a transmission module 442 configured to transmit the first content and the switching instruction to the second display unit to enable the second display unit to display the first content in response to the first and second sub-instructions.

Further, the second display unit is configured to receive a part of the first content and display it immediately, or receive the first content completely and then display it.

Further, the first display unit is in a third power consumption state before the switching instruction is generated. The electronic device further includes: a second switching unit 45 configured to switch, after the switching instruction is generated the first display unit from the third power consumption state to a fourth power consumption state having a lower power consumption than the third power consumption state in response to the switching instruction.

Further, the switching instruction can include a third sub-instruction for instructing the first display unit to be switched from the third power consumption state to the fourth power consumption state and a fourth sub-instruction for instructing the first display unit to stop displaying the first content.

Further the first switching unit 44 includes: a second obtaining module 443 configured to obtain a direction corresponding to an operation performed by a user; a determination module 444 configured to determine a display position of the first content based on the direction to obtain position information; and a display module 445 configured to display the first content at a position corresponding to the position information based on the position information.

Further, the second display unit is a display. The display module 445 includes: an obtaining sub-module 4451 configured to obtain an identifier of the display corresponding to the position information; and a display sub-module 4452 configured to display the first content on the display based on the identifier of the display.

Further, the second display unit is a projector. The display module 445 includes: a determination sub-module 4453 configured to determine a projection direction of the projector based on the position information, the position information containing a direction parameter representing the projection direction of the projector; and a projection sub-module 4454 configured to project the first content to a position corresponding to the direction parameter for displaying using the projector based on the direction parameter.

Further, the electronic device further includes a distance sensor. The detection unit 41 includes a first detection module 411 configured to detect a distance between a first display unit and a nearby object using the distance sensor. The determination unit 42 includes a first determination module 421 configured to determine whether the distance is shorter than a predetermined distance. The predetermined condition is satisfied when the distance is shorter than the predetermined distance.

Further, the electronic device further includes an image capture device. The detection unit 41 includes a third obtaining module 412 configured to obtain an instruction image using the image capture device. The determination unit 42 includes a second determination module 422 configured to determine whether the instruction image is a predetermined image. The predetermined condition is satisfied when the instruction image is the predetermined image. The generation unit 43 includes a generation module 431 configured to generate the switching instruction based on the instruction image when the determination result indicates that the trigger event satisfies the predetermined condition.

Further, the detection unit 41 includes a second detection module 413 configured to detect an application corresponding to the first content. The determination unit 42 includes a third determination module 423 configured to determine whether the application is a predetermined application. The predetermined condition is satisfied when the application is the predetermined application.

With the above solution, the electronic device can generate the switching instruction in response to detecting various trigger events. The electronic device can switch the second display unit from the first power consumption state to the second power consumption state in response to the switching instruction and display the first content on the second display unit. That is, the electronic device can display the first content displayed on the first display unit on the second display unit in response to the switching instruction. In this way, the first content can be displayed on both the first and second display units. Compared with the conventional scheme where the first content is displayed only on the first display unit, thereby enlarging the content display area on the display unit.

From the above description of the embodiments, it can be appreciated by those skilled in the art that the present invention can be implemented in software in combination with necessary general purpose hardware. Of course the present invention can be implemented in hardware, but the software implementation will be preferable in most cases. In view of this, the technical solutions according to the embodiments of the present application, or in other words a part thereof which makes contribution over the prior art, can be substantially embodied in a form of software product. The computer software product can be stored in a readable storage media, such as floppy disk, magnetic disk, optical disc and the like, containing instructions which cause a computer device (which can be a personal computer, a server, a network device or the like) to perform the method according to the embodiments of the present application.

While the embodiments of the present invention have been described above, the scope of the present invention is not limited to these embodiments. Those skilled in the art can make further modifications and changes to these embodiments without departing from the scope of the present invention. These modifications and changes are to be encompassed by the scope of the present invention. Therefore, the scope of the present invention is defined only by the claims as attached.

What is claimed is:

1. A display method, applied in an electronic device comprising or being connected with a first display unit and further comprising or being connected with a second display unit, the method comprising:
    detecting a trigger event when the first display unit displays a first content and the second display unit is in a first power consumption state;
    determining whether the trigger event satisfies a predetermined condition to obtain a determination result;
    generating a switching instruction when the determination result indicates that the trigger event satisfies the predetermined condition; and
    switching the second display unit from the first power consumption state to a second power consumption state and displaying the first content on the second display unit in response to the switching instruction, wherein the first power consumption state has a lower power consumption than the second power consumption state;
    wherein the electronic device further comprises a distance sensor,
    said detecting the trigger event comprises detecting a distance between the first display unit and a nearby object using the distance sensor, and
    the method further comprises, in response to determining the distance is shorter than a predetermined distance so that the first content cannot be viewed clearly by a user, switching a display of the first content from the first display unit to the second display unit.

2. The display method of claim 1, wherein the switching instruction comprises a first sub-instruction for instructing the second display unit to be switched from the first power consumption state to the second power consumption state and a second sub-instruction for instructing the second display unit to display the first content, and said switching the second display unit from the first power consumption state to the second power consumption state and displaying the first content on the second display unit in response to the switching instruction comprises:
    obtaining the first content;
    transmitting the first content and the switching instruction to the second display unit to enable the second display unit to display the first content in response to the first and second sub-instructions.

3. The display method of claim 2, wherein the second display unit displays the first content in response to the first and second sub-instructions by:
    receiving a part of the first content and displaying it immediately; or
    receiving the first content completely and then displaying it.

4. The display method of claim 1, wherein the first display unit is in a third power consumption state before the switching instruction is generated, and the method further comprises, after the switching instruction is generated:
    switching the first display unit from the third power consumption state to a fourth power consumption state having a lower power consumption than the third power consumption state in response to the switching instruction.

5. The display method of claim 4, wherein the switching instruction comprises a third sub-instruction for instructing the first display unit to be switched from the third power consumption state to the fourth power consumption state and a fourth sub-instruction for instructing the first display unit to stop displaying the first content.

6. The display method of claim 1, wherein said displaying the first content on the second display unit comprises:
    obtaining a direction corresponding to an operation performed by a user;
    determining a display position of the first content based on the direction to obtain position information; and
    displaying the first content at a position corresponding to the position information based on the position information.

7. The display method of claim 6, wherein the second display unit is a display, and said displaying the first content at a position corresponding to the position information based on the position information comprises:
    obtaining an identifier of the display corresponding to the position information; and
    displaying the first content on the display based on the identifier of the display.

8. The display method of claim 6, wherein the second display unit is a projector, and said displaying the first content at a position corresponding to the position information based on the position information comprises:
   determining a projection direction of the projector based on the position information, the position information containing a direction parameter representing the projection direction of the projector; and
   projecting the first content to a position corresponding to the direction parameter for displaying using the projector based on the direction parameter.

9. The display method of claim 1, wherein the electronic device further comprises an image capture device,
   wherein detecting the trigger event comprises obtaining an instruction image using the image capture device, and
   wherein determining whether the trigger event satisfies the predetermined condition to obtain a determination result comprises determining whether the instruction image is predetermined image, wherein the predetermined condition is satisfied when the instruction image is a predetermined image.

10. The display method of claim 1, wherein said detecting a trigger event comprises detecting an application corresponding to the first content, and
   said determining whether the trigger event satisfies a predetermined condition to obtain a determination result comprises determining whether the application is a predetermined application to obtain the determination result, wherein the predetermined condition is satisfied when the application is the predetermined application.

11. An electronic device comprising or being connected with a first display unit and further comprising or being connected with a second display unit, the electronic device further comprising:
   a distance sensor;
   a processor configured to:
      detect a trigger event when the first display unit displays a first content and the second display unit is in a first power consumption state;
      determine whether the trigger event satisfies a predetermined condition to obtain a determination result;
      generate a switching instruction when the determination result indicates that the trigger event satisfies the predetermined condition; and
      switch the second display unit from the first power consumption state to a second power consumption state and display the first content on the second display unit in response to the switching instruction, wherein the first power consumption state has a lower power consumption than the second power consumption state;
   wherein the distance sensor is configured to detect a distance between the first display unit and a nearby object, and
   the processor is further configured to, in response to determining the distance detected by the distance sensor is shorter than a predetermined distance so that the first content can't be viewed clearly by a user, switch the display of the first content from the first display unit to the second display unit.

12. The electronic device of claim 11, wherein the switching instruction comprises a first sub-instruction for instructing the second display unit to be switched from the first power consumption state to the second power consumption state and a second sub-instruction for instructing the second display unit to display the first content, and
   the processor is further configured to:
      obtain the first content; and
      transmit the first content and the switching instruction to the second display unit to enable the second display unit to display the first content in response to the first and second sub-instructions.

13. The electronic device of claim 12, wherein the second display unit is configured to receive a part of the first content and display it immediately, or receive the first content completely and then display it.

14. The electronic device of claim 11, wherein the first display unit is in a third power consumption state before the switching instruction is generated, and
   the processor is further configured to switch, after the switching instruction is generated the first display unit from the third power consumption state to a fourth power consumption state having a lower power consumption than the third power consumption state in response to the switching instruction;
   the switching instruction comprises a third sub-instruction for instructing the first display unit to be switched from the third power consumption state to the fourth power consumption state and a fourth sub-instruction for instructing the first display unit to stop displaying the first content.

15. The electronic device of claim 11, wherein the processor is further configured to:
   obtain a direction corresponding to an operation performed by a user;
   determine a display position of the first content based on the direction to obtain position information; and
   display the first content at a position corresponding to the position information based on the position information.

16. The electronic device of claim 15, wherein the second display unit is a display, and the display module is configured to obtain an identifier of the display corresponding to the position information; and display the first content on the display based on the identifier of the display.

17. The electronic device of claim 15, wherein the second display unit is a projector, and is further configured to:
   determine a projection direction of the projector based on the position information, the position information containing a direction parameter representing the projection direction of the projector; and
   project the first content to a position corresponding to the direction parameter for displaying using the projector based on the direction parameter.

* * * * *